US012645557B2

(12) United States Patent
Kumar et al.

(10) Patent No.: US 12,645,557 B2
(45) Date of Patent: Jun. 2, 2026

(54) SPECIFICITY AND ENTROPY FOR EVENT DATA ANALYSIS

(71) Applicant: Capital One Services, LLC, McLean, VA (US)

(72) Inventors: Sonu Kumar, Siwan (IN); Purna Prasanna Srikar Raju Regati, Andhra Pradesh (IN); Rama Teja Gampa, Hyderabad (IN)

(73) Assignee: Capital One Services, LLC, McLean, VA (US)

( * ) Notice: Subject to any disclaimer, the term of this patent is extended or adjusted under 35 U.S.C. 154(b) by 100 days.

(21) Appl. No.: 18/488,476

(22) Filed: Oct. 17, 2023

(65) Prior Publication Data

US 2025/0123938 A1    Apr. 17, 2025

(51) Int. Cl.
*G06F 11/34*        (2006.01)
*G06F 11/30*        (2006.01)

(52) U.S. Cl.
CPC ...... *G06F 11/3438* (2013.01); *G06F 11/3075* (2013.01)

(58) Field of Classification Search
CPC ............. G06F 11/3438; G06F 11/3075; H04L 67/535; H04L 63/1416
See application file for complete search history.

(56) References Cited

U.S. PATENT DOCUMENTS 12,182,174 B1 * 12/2024 Beckert ............... G06F 16/9577
2010/0153316 A1 * 6/2010 Duffield .................. H04L 41/16
706/47

2011/0252032 A1 * 10/2011 Fitzgerald ............... H04L 63/20
709/224
2019/0294720 A1 * 9/2019 Beringer ................. G06F 16/26
2023/0229768 A1 * 7/2023 Snyder ................... G06V 10/74
726/23
2024/0193165 A1 * 6/2024 Spannhake ....... G06F 16/24556

OTHER PUBLICATIONS

R. M. M. Vallim, J. A. A. Filho, A. C. P. L. F. de Carvalho and J. Gama, "A Density-Based Clustering Approach for Behavior Change Detection in Data Streams," 2012 Brazilian Symposium on Neural Networks, Curitiba, Brazil, 2012, pp. 37-42, doi: 10.1109/SBRN. 2012.22. (Year: 2012).*

* cited by examiner

*Primary Examiner* — Rachel J Hackenberg
(74) *Attorney, Agent, or Firm* — Harrity & Harrity, LLP

(57)        ABSTRACT

In some implementations, an event data analysis system may identify event data that indicates user interactions with an application, each of the user interactions corresponding to an interaction with data filters. The system may generate specificity scores, each of the specificity scores indicating, for a corresponding user interaction, a measure of specificity associated with data filters that correspond to the corresponding user interaction. The system may filter the event data stream based on the specificity scores. The system may generate at least one entropy value for at least one data filter, each entropy value indicating a rate of change of a corresponding data filter. The system may identify, based on the specificity scores and the at least one entropy value, a set of relevant filter values associated with the event data. The system may provide output indicating the set of relevant filter values.

20 Claims, 4 Drawing Sheets

400

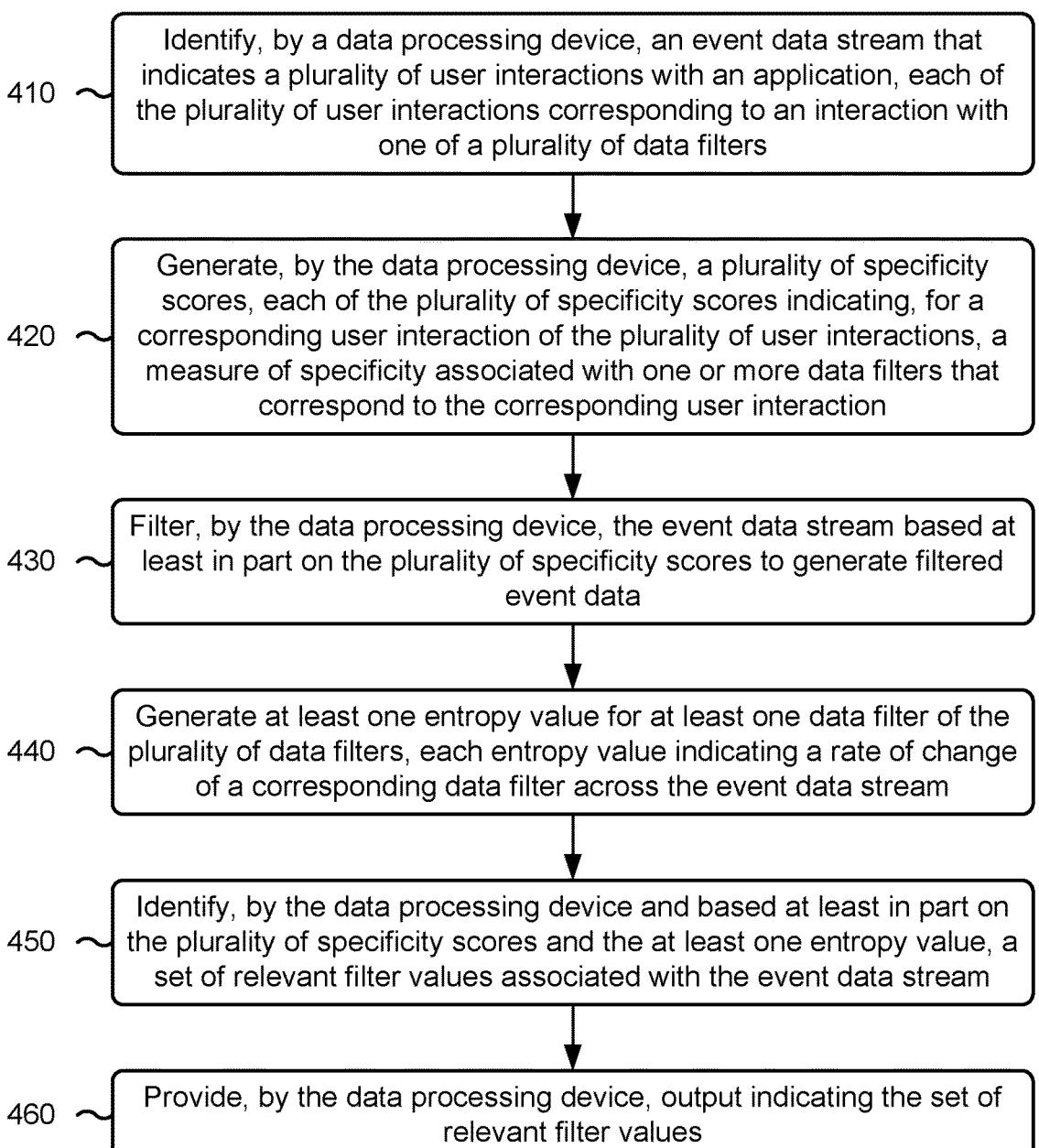

410   Identify, by a data processing device, an event data stream that indicates a plurality of user interactions with an application, each of the plurality of user interactions corresponding to an interaction with one of a plurality of data filters 420   Generate, by the data processing device, a plurality of specificity scores, each of the plurality of specificity scores indicating, for a corresponding user interaction of the plurality of user interactions, a measure of specificity associated with one or more data filters that correspond to the corresponding user interaction 430   Filter, by the data processing device, the event data stream based at least in part on the plurality of specificity scores to generate filtered event data 440   Generate at least one entropy value for at least one data filter of the plurality of data filters, each entropy value indicating a rate of change of a corresponding data filter across the event data stream 450   Identify, by the data processing device and based at least in part on the plurality of specificity scores and the at least one entropy value, a set of relevant filter values associated with the event data stream 460   Provide, by the data processing device, output indicating the set of relevant filter values

FIG. 4

SPECIFICITY AND ENTROPY FOR EVENT DATA ANALYSIS

BACKGROUND

In a computing and networking context, event data may include any data associated with an even that is provided by hardware and/or software. Event data may be analyzed by various systems, including real-time event data analysis systems for performing actions in response to certain events, and/or non-real-time analysis systems for various purposes.

SUMMARY

Some implementations described herein relate to an event data analysis system for analyzing event data. The event data analysis system may include one or more memories and one or more processors communicatively coupled to the one or more memories. The one or more processors may be configured to identify an event data stream that indicates a plurality of user interactions with an application, each of the plurality of user interactions corresponding to an interaction with one of a plurality of data filters. The one or more processors may be configured to generate a plurality of specificity scores, each of the plurality of specificity scores indicating, for a corresponding user interaction of the plurality of user interactions, a measure of specificity associated with one or more data filters that correspond to the corresponding user interaction. The one or more processors may be configured to filter the event data stream based at least in part on the plurality of specificity scores to generate filtered event data. The one or more processors may be configured to analyze, based at least in part on the plurality of specificity scores, the filtered event data to identify one or more pivot points associated with the filtered event data, each pivot point being associated with a change in specificity. The one or more processors may be configured to identify, based at least in part on the plurality of specificity scores and the pivot points, a set of relevant filter values associated with the event data stream. The one or more processors may be configured to provide output indicating the set of relevant filter values.

Some implementations described herein relate to a method for analyzing event data. The method may include identifying, by a data processing device, an event data stream that indicates a plurality of user interactions with an application, each of the plurality of user interactions corresponding to an interaction with one of a plurality of data filters. The method may include generating, by the data processing device, a plurality of specificity scores, each of the plurality of specificity scores indicating, for a corresponding user interaction of the plurality of user interactions, a measure of specificity associated with one or more data filters that correspond to the corresponding user interaction. The method may include filtering, by the data processing device, the event data stream based at least in part on the plurality of specificity scores to generate filtered event data. The method may include generating at least one entropy value for at least one data filter of the plurality of data filters, each entropy value indicating a rate of change of a corresponding data filter across the event data stream. The method may include identifying, by the data processing device and based at least in part on the plurality of specificity scores and the at least one entropy value, a set of relevant filter values associated with the event data stream. The method may include providing, by the data processing device, output indicating the set of relevant filter values.

BRIEF DESCRIPTION OF THE DRAWINGS

FIG. 4 is a flowchart of an example process associated with specificity and entropy for event data analysis, in accordance with some embodiments of the present disclosure.

DETAILED DESCRIPTION

Figure 1:
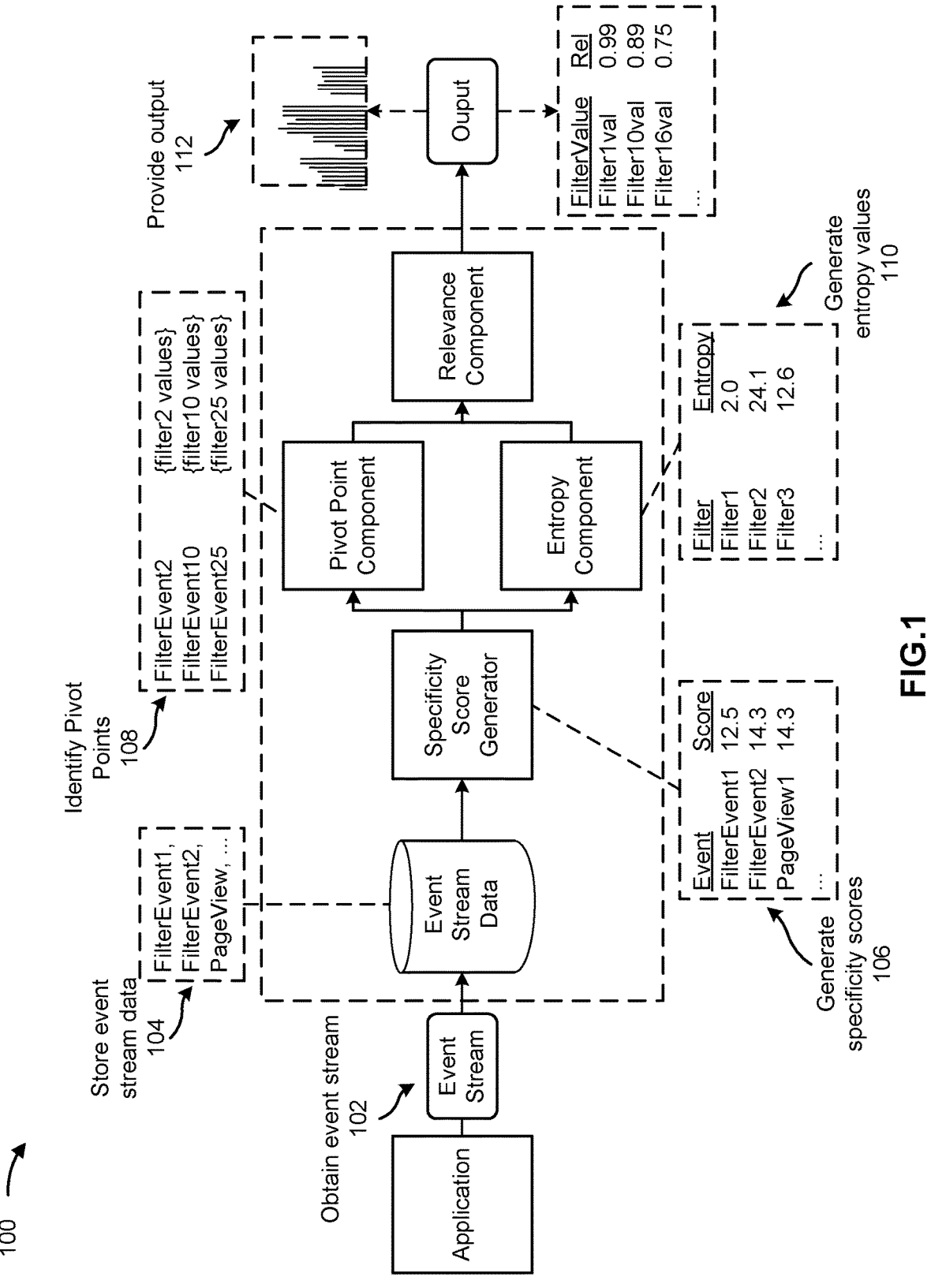
FIG. 1 is a diagram of an example associated with specificity and entropy for event data analysis, in accordance with some embodiments of the present disclosure.

The following detailed description of example implementations refers to the accompanying drawings. The same reference numbers in different drawings may identify the same or similar elements.

Some implementations described herein enable a computing system to perform efficient analysis of an event data stream by using data filters to generate specificity scores that can be used to filter and analyze portions of the event data stream to identify patterns and other relevant information. As a result, the computing system may be able to efficiently process large volumes of data in a manner that conserves computing resources (e.g., processing resources, memory resources, communication resources, and/or power resources, among other examples) relative to prior approaches for analyzing data, and the computing system may be able to identify relevant information that might otherwise be difficult and/or computationally expensive to detect.

Analyzing event data often uses significant computing resources, and the computational complexity generally increases as the amount of event data to be processed increases. For example, one goal of analyzing event data may be to identify patterns in the event data and, as pattern complexity increases and/or the amount and types of event data increases, it becomes computationally expensive to identify specific patterns. In the context of an event data stream that includes filter interactions (e.g., interactions that filter a data set into a smaller data set, such as a user interaction with filters for a set of data), it may be difficult and computationally expensive to identify relevant patterns from the filter interactions. While advanced computing techniques may facilitate this task, including machine learning, generative artificial intelligence, and other techniques, such techniques may require significant computing power and may not result in relevant output.

Some implementations described herein include an event data analysis system that identifies relevant output, from event data that includes filter interactions, in a computationally efficient manner. For example, the event data analysis system may identify an event data stream that indicates user interactions with multiple data filters (e.g., a time-ordered stream of a user's selection of filter values when attempting to narrow options retrieved as a result of the filter being applied to a data set). Example applications and filter interactions may include a database search application where a user interacts with filters to narrow the results retrieved from a database, an e-commerce website application where a user interacts with filters to narrow an inventory of available products, an Internet search engine application where a user interacts with filters to refine a search query and/or results retrieved from the search query, among other examples. Using the user interactions with the data filters, the event data analysis system may generate specificity scores for each user interaction. A specificity score may provide a measure of specificity associated with any applied data filters associated with the user interaction. For example, as a user applies filters and results are excluded from a data set, the specificity score increases (e.g., relative to a prior specificity score); if a data filter interaction removes or otherwise changes a data filter and results are added from the data set, the specificity score decreases.

The specificity scores may be used by the event data analysis system to filter the event data stream. For example, the event data analysis system may improve efficiency in analysis by excluding event data that does not affect specificity. Filtering the event data stream may improve the efficiency of the analysis performed by the event data analysis system, for example, by reducing the amount of data to be processed.

In some implementations, the event data analysis system may analyze the filtered event data, using the specificity scores, to identify pivot points in the filtered event data. Pivot points may be associated with a particular pattern that provides relevant information from the even data stream. For example, a pivot point may represent a maximum of local maximums in a time-ordered series of specificity scores (e.g., a peak in specificity scores over time). The pivot points, and specificity scores, may be further used by the event data system to identify relevant filter values as output. These relevant filter values may be used for further analysis that may provide valuable insight that might not otherwise be detected and/or might otherwise be computationally expensive to detect. For example, a pivot point may indicate, for a series of user interactions with an application, a user's ideal set of filters, a dead end in a search, or a successful search, among other examples.

In some implementations, the event data analysis system may generate entropy values for data filters, where the entropy values indicate a rate of change associated with the filter values over time. Entropy values may also be used by the event data analysis system to identify relevant filter values. For example, an entropy value may indicate, for a series of user interactions with an application, which filters are relevant or desirable (e.g., due to fewer changes to the filter) to whatever the user was trying to achieve with the application (e.g., database search, e-commerce search, Internet search, and/or the like).

In this way, the event data analysis system enables the identification of relevant filter values from event data that would otherwise be difficult and computationally expensive to identify. This may conserve computing resources relative to prior systems for analyzing and detecting patterns in event data. The event data analysis system may also surface patterns that may have otherwise gone undetected (e.g., due to the computational complexity associated with pattern identification and the amount of data being processed), enabling those patterns to be used for a variety of purposes. For example, the identified relevant filter values may be useful for identifying problem areas associated with the source of the event data (e.g., problems in software or hardware), identifying data filters and/or corresponding values of frequent interest or use, and/or filtering event data for more efficient processing, among other examples.

FIG. 1 is a diagram of an example 100 associated with specificity and entropy for event data analysis. As shown in FIG. 1, example 100 includes an event data analysis system (e.g., represented by the dotted-line rectangle and which may include a specificity score generator device, a pivot point device, an entropy device, and/or a relevance device, among other examples), as well as an application. These devices are described in more detail in connection with FIGS. 2 and 3. As used herein, the terms "event data stream" and "event data" may be used interchangeably, as well as the terms "filter" and "data filter." In addition, features described with respect to a filter may equally apply to a filter value. For example, "filter" may refer to the filter itself (e.g., vehicle type) and/or the filter value (e.g., truck).

As shown by reference number 102, the event data analysis system may obtain an event data stream from an application. In some aspects, the event data stream may include a time-ordered series of event data indicating interactions with the application. For example, in the context of a web application for e-commerce, the event data may include data identifying interactions between a user and the application (e.g., a log). Example user interactions may include views of certain web pages, clicks on certain user interface elements, addition/change/removal of data filters, entry of values, and/or the like. In some aspects, as shown by reference number 104, the event data analysis system may store the event data. For example, the event data may be stored by the event data analysis system for further processing.

As shown by reference number 106, the event data analysis system may generate specificity scores for the event data. Each specificity score indicates a measure of specificity associated with data filters that were applied at the time of the user interaction. Using the e-commerce web application example, a user may have applied multiple data filters that narrow an inventory of resulting products that are displayed to the user, an interaction with a filter may change the specificity score (e.g., increase the specificity score if the filter change results in more specific results, or decrease the specificity score if the filter change results in fewer specific results), while other interactions, such as interacting with a product, clicking a button, viewing a product page, and/or the like, may not affect the specificity score.

In some aspects, the event data analysis system may generate the specificity score based at least in part on the number of results that are excluded by the data filters. For example, assuming that an e-commerce web application has an inventory of 1000 products, and a data filter reduces the available products that meet the filter criteria to 600 products, the specificity score may be increased based at least in part on the number of results being excluded (e.g., 400 results in this example). The number of results excluded by a data filter may be represented in ways other than total number of results. For example, the number of results may be based on a percentage of results being excluded by a data filter (e.g., in the example above, the specificity score may be determined based on the 400 results being a 40% reduction in the number of results). In a situation where a user interaction does not change the number of results excluded by the filters, the specificity score may not change.

In some aspects, each data filter may be associated with a weight that is based at least in part on a number of available values associated with the data filter. Continuing with the e-commerce example, some filters offer a binary choice of values (e.g., a new product or a used product), some have multiple values to select from (e.g., a color, type, location, etc. associated with a product), and some have a near infinite number of available values (e.g., a text input filter). In this situation, the specificity score may be generated based on a number of filter values excluded by a user's filter value selection(s). For example, a binary filter option may be associated with a weight of 0.5, a multiple choice filter with one of five options selection may be associated with a weight 0.2 (e.g., $\frac{1}{5}$=0.2), and a text filter may be associated with a predetermined weight and/or a weight based on the input (e.g., a longer value may result in a higher weight than a shorter value). Additionally, or alternatively, the weights may be based at least in part on the number of results excluded by the data filters, as described herein.

In some aspects, the specificity score may be generated as a logarithm of a product of weights associated with the set of data filters. For example, given filter weights of 2, 10, 10, 40, 50, and 2.5, the specificity score may be generated as log(2*10*10*40*50*2.5)=log(1000000)=6. Adding a filter with a weight of 20 to the foregoing example changes the specificity score to log(20000000)=~7.3. Removing a filter with a weight of 50 (instead of adding a filter with a weight of 20), would change the specificity score to log(20000) =~4.3. Other example formulas may also be used, such as a sum of weights, product of weights, and/or a logarithm of a quotient of weights, among other examples.

In some aspects, the event data analysis system may filter the event data based at least in part on the specificity scores. For example, the event data analysis system may remove a portion of the event data to reduce the amount of data to be further processed by the system. Event data may be removed based on a variety of criteria or conditions. For example, the event data analysis system may filter out event data that matches, or does not match, a particular type of event. In this situation, the event data analysis system may filter events that are not associated with a data filter (e.g., events that do not affect the specificity score). As another example, the event data analysis system may filter out event data having specificity scores that do not satisfy a threshold. For example, the event data analysis system may set a dynamic threshold based on the highest (and/or lowest) N specificity scores observed in the event data and filter out event data associated with a specificity score that does not satisfy the threshold.

In some aspects, the event data analysis system may identify a particular user interaction (e.g., a particular point) in the event data that is associated with a reduction in specificity score that satisfies a threshold and filter event data occurring after the particular user interaction. For example, in a situation where the specificity score changes by a threshold amount, the subsequent user interactions may not be particularly helpful or relevant for identifying pivot points, entropy values, relevant filter values, and/or other features and may be filtered out of the data set.

Other forms of filtering may also be used to reduce the amount of data to be processed by the event data analysis system. By filtering the event data, the event data analysis system may improve computational efficiency and conserve computing resources during subsequent data processing operations.

As shown by reference number 108, the event data analysis system may analyze the event data to identify one or more pivot points, where each pivot point is associated with a change in specificity. For example, pivot points may be identified whenever a user interaction results in a change in specificity score that satisfies a threshold. Example threshold values may include 0 (e.g., any change in specificity score satisfies the threshold), a predetermined value, a value determined relative to specificity scores in the data set, or a percentage-based value, among other examples. Depending on the application, pivot points of interest may be at points of low specificity and/or points of high specificity.

In some aspects, the event data analysis system may analyze changes in the specificity scores over time to identify local maximum points in the event data. Local maximum points may be identified as user interactions having a higher specificity score than other specificity scores of other user interactions prior to and after the user interaction (e.g., immediately prior to and after, or a predetermined number of user interactions prior to and after). Local maximum points may be identified as pivot points. In some aspects, the event data analysis system may identify, as a pivot point, a local maximum point associated with a higher specificity score than other specificity scores for other local maximum points prior to and after the local maximum point (e.g., immediately prior to and after, or a predetermined number of local maximum points prior to and after).

As shown by reference number 110, the event data analysis system may generate at least one entropy value for at least one data filter. Entropy values may indicate a rate of change for a corresponding data filter. For example, a filter that is often changed may have a higher entropy value than a filter that often remains the same. When observed across the event data stream, entropy values may provide insight into which filters are more or less volatile, which may be a valuable metric for identifying relevant filters and other patterns in the event data. Using the e-commerce application example, a user who is shopping for a vehicle may have many filters to choose from (e.g., vehicle make, model, body type, year, price, transmission, and/or the like), and if the filter associated with vehicle type (e.g., sedan, sport utility vehicle, truck, and/or the like) is unchanged throughout the user's session, the corresponding vehicle type filter may have a low entropy value, which may indicate that the user has a strong preference for the selected vehicle type. A different filter, such as vehicle make, may be changed more often during the user's session, which may result in a higher entropy value, which is indicative that the vehicle make filter might be less important to the user than the vehicle type. In this way, entropy values may enable the identification of patterns in the event data stream that might not otherwise be detected and/or that might be computationally expensive to detect.

As shown by reference number 112, the event data analysis system may identify relevant filter values and provide output indicating the relevant filter values. In some aspects, the relevant filter values may be identified based on one or more of the specificity score(s), pivot point(s), and/or entropy value(s). For example, a higher (or lower, depending on the context) specificity score may be indicative of a filter (and corresponding filter value) that might be more relevant to the event data stream and/or a user associated with the event data stream than other filters with lower (or higher) specificity scores. A pivot point may be more likely to be indicative of a filter (and corresponding filter value) that is more relevant than filters that are not associated with a pivot point. A lower (or higher, depending on the context) entropy value may be indicative of a filter (and corresponding filter value) that might be more relevant than other filters with higher (or lower) entropy values.

In some aspects, one or more thresholds may be used to identify relevant filters. For example, a relevant filter may be identified as relevant if it has a corresponding specificity score and/or entropy value that satisfies a corresponding specificity threshold and/or entropy threshold. In some aspects, a relevant filter may only be identified as relevant if it corresponds to a pivot point. The specificity scores, pivot point designation, and/or entropy values may be used in a variety of ways to determine relevance of a corresponding filter. For example, the event data analysis system may determine one or more relevance scores for filters based at least in part on specificity scores, pivot point designation, and/or entropy values. The relevance scores may be relative values or absolute values that can be used to compare the relevance of particular filters within the data stream to identify filters that are relevant. For example, the event data analysis system may identify, as relevant filters, filters with the top M relevance scores, and/or filters having a relevance score that satisfies a relevance score threshold.

In some aspects, the event data analysis system, when providing output, may provide data indicating a visual representation of the specificity scores and pivot points over time. For example, and as shown by reference number 112, the visual representation may include a plot of specificity scores over time, which may present patterns in the data for a user that views the visual representation. Other information, including pivot points and entropy values, may also be included in the visual representations. In some aspects, the event data analysis system, when providing output, may provide data indicating a list of relevant filter values. For example, the most relevant filters, with or without their corresponding filter values, may be provided as output. A relevance score, if applicable, may also be provided, to present patterns of relevance identified in the event data. In some aspects, the event data analysis system, when providing output, may provide data indicating a recommendation associated with the relevant filter values. For example, depending on the application and the context, recommendations may vary from a recommendation to investigate a particular filter and/or filter value, a recommendation to test an application in association with a particular filter and/or filter value, a recommendation to manage inventory associated with a particular filter and/or filter value, a recommendation to provide a particular filter and/or filter value to another system for further processing, and/or the like.

As shown, the event data analysis system enables the identification of relevant filter values from event data that would otherwise be difficult and computationally expensive to identify. This may conserve computing resources relative to prior systems for analyzing and detecting patterns in event data. The event data analysis system may also surface patterns that may have otherwise gone undetected (e.g., due to the computational complexity associated with pattern identification and the amount of data being processed), enabling those patterns to be used for a variety of purposes. For example, the identified relevant filter values may be useful for identifying problem areas associated with the source of the event data (e.g., problems in software or hardware), identifying data filters and/or corresponding values of frequent interest or use, and/or filtering event data for more efficient processing, among other examples.

As indicated above, FIG. 1 is provided as an example. While described in the context of data filters applied to an e-commerce web application, other example applications and contexts are also contemplated, such as data filters applied for database searching, Internet searching, and/or the like. Other examples may differ from what is described with regard to FIG. 1.

Figure 2:
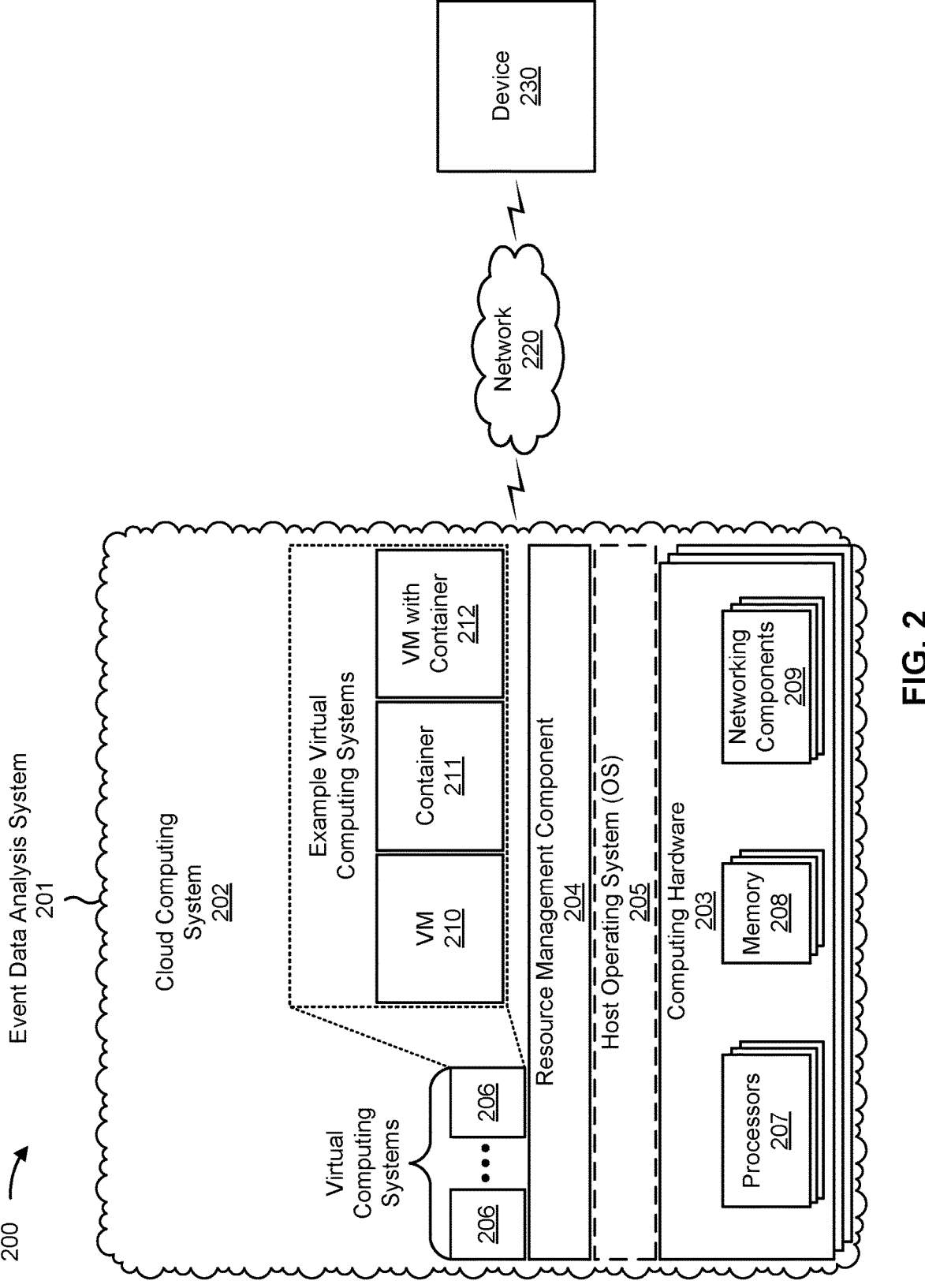
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a event data analysis system 201, which may include one or more elements of and/or may execute within a cloud computing system 202. The cloud computing system 202 may include one or more elements 203-212, as described in more detail below. As further shown in FIG. 2, environment 200 may include a network 220 and/or a device 230. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the event data analysis system 201 may include one or more elements 203-212 of the cloud computing system 202, may execute within the cloud computing system 202, and/or may be hosted within the cloud computing system 202, in some implementations, the event data analysis system 201 may not be cloud-based (e.g., may be implemented outside of a cloud computing system) or may be partially cloud-based. For example, the event data analysis system 201 may include one or more devices that are not part of the cloud computing system 202, such as device 300 of FIG. 3, which may include a standalone server or another type of computing device. The event data analysis system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The device 230 may include any of the devices depicted in FIG. 1, such as an application device (e.g., an application server, such as a web server, database server, and/or the like) that provides event data for the event data analysis system 201, a specificity score generator device that generates specificity scores from the event data, a pivot point component/device that identifies pivot points in the event data, an entropy component/device that generates entropy values associated with the event data, and/or a relevance component/device that uses the output from other devices to identify and output data associated with relevant data filters.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
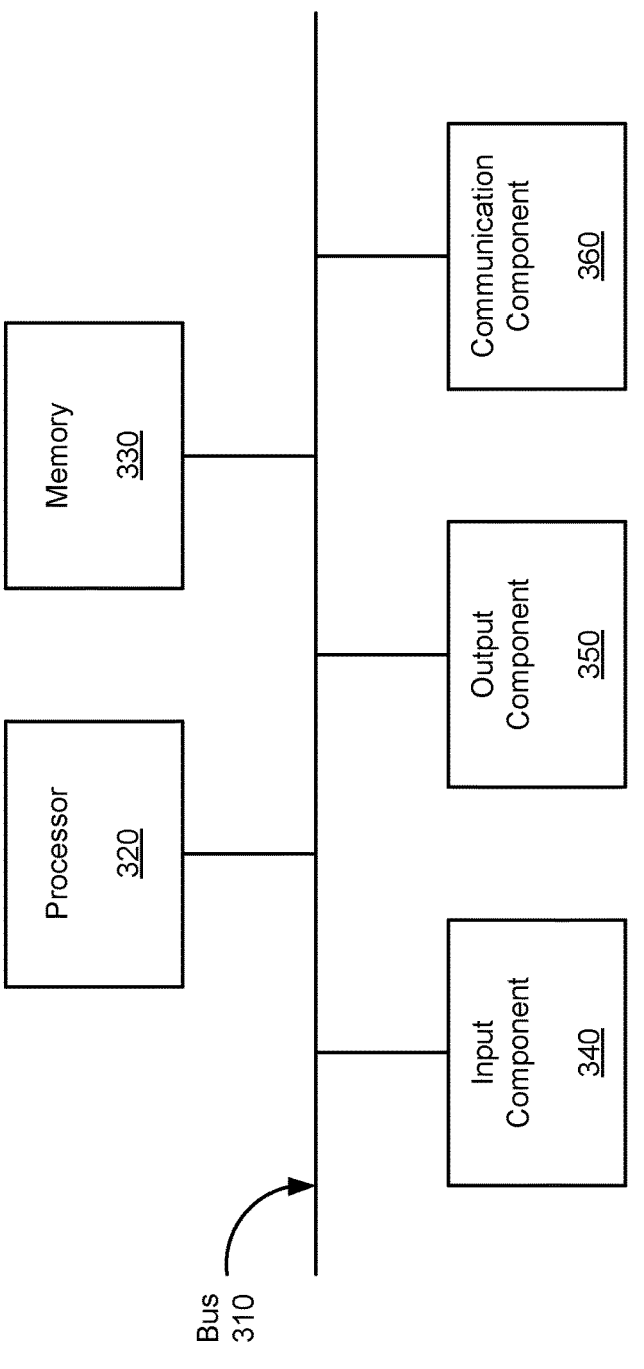
FIG. 3 is a diagram of example components of a device associated with specificity and entropy for event data analysis, in accordance with some embodiments of the present disclosure.

FIG. 3 is a diagram of example components of a device 300 associated with specificity and entropy for event data analysis. The device 300 may correspond to event data analysis system 201 and/or device 230. In some implementations, event data analysis system 201 and/or device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device

300 may perform one or more functions described as being performed by another set of components of the device 300.

FIG. 4 is a flowchart of an example process 400 associated with specificity and entropy for event data analysis. In some implementations, one or more process blocks of FIG. 4 may be performed by the event data analysis system 201. In some implementations, one or more process blocks of FIG. 4 may be performed by another device or a group of devices separate from or including the event data analysis system 201, such as the device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include identifying an event data stream that indicates a plurality of user interactions with an application, each of the plurality of user interactions corresponding to an interaction with one of a plurality of data filters (block 410). For example, the event data analysis system 201 (e.g., using processor 320 and/or memory 330) may identify an event data stream that indicates a plurality of user interactions with an application, each of the plurality of user interactions corresponding to an interaction with one of a plurality of data filters, as described above in connection with reference number 102 of FIG. 1. As an example, the event data analysis system may identify user interactions with filters for a database application.

As further shown in FIG. 4, process 400 may include generating a plurality of specificity scores, each of the plurality of specificity scores indicating, for a corresponding user interaction of the plurality of user interactions, a measure of specificity associated with one or more data filters that correspond to the corresponding user interaction (block 420). For example, the event data analysis system 201 (e.g., using processor 320 and/or memory 330) may generate a plurality of specificity scores, each of the plurality of specificity scores indicating, for a corresponding user interaction of the plurality of user interactions, a measure of specificity associated with one or more data filters that correspond to the corresponding user interaction, as described above in connection with reference number 106 of FIG. 1. As an example, the event data analysis system may generate specificity scores for the filters applied to a database search.

As further shown in FIG. 4, process 400 may include filtering the event data stream based at least in part on the plurality of specificity scores to generate filtered event data (block 430). For example, the event data analysis system 201 (e.g., using processor 320 and/or memory 330) may filter the event data stream based at least in part on the plurality of specificity scores to generate filtered event data, as described above in connection with reference number 104 and/or 106 of FIG. 1. As an example, the event data analysis system may filter out user interactions that do not satisfy a threshold specificity score to reduce the amount of data being processed.

As further shown in FIG. 4, process 400 may include generating at least one entropy value for at least one data filter of the plurality of data filters, each entropy value indicating a rate of change of a corresponding data filter across the event data stream (block 440). For example, the event data analysis system 201 (e.g., using processor 320 and/or memory 330) may generate at least one entropy value for at least one data filter of the plurality of data filters, each entropy value indicating a rate of change of a corresponding data filter across the event data stream, as described above in connection with reference number 110 of FIG. 1. As an example, the event data analysis system may generate entropy values for the database filters to indicate how often the database filters change over time.

As further shown in FIG. 4, process 400 may include identifying, based at least in part on the plurality of specificity scores and the at least one entropy value, a set of relevant filter values associated with the event data stream (block 450). For example, the event data analysis system 201 (e.g., using processor 320 and/or memory 330) may identify, based at least in part on the plurality of specificity scores and the at least one entropy value, a set of relevant filter values associated with the event data stream, as described above in connection with reference number 112 of FIG. 1. As an example, the event data analysis system may identify relevant filters that were applied while a user was interacting with the database application.

As further shown in FIG. 4, process 400 may include providing output indicating the set of relevant filter values (block 460). For example, the event data analysis system 201 (e.g., using processor 320 and/or memory 330) may provide output indicating the set of relevant filter values, as described above in connection with reference number 112 of FIG. 1. As an example, the event data analysis system may output a list of the most relevant filters.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIG. 1. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An event data analysis system for analyzing event data, comprising:

one or more memories; and one or more processors, coupled to the one or more memories, configured to:

identify an event data stream that indicates a plurality of user interactions with a plurality of data filters of an application;

generate, after identifying the event data stream, a plurality of specificity scores, each of the plurality of specificity scores indicating, for a corresponding user interaction of the plurality of user interactions, a measure of specificity associated with one or more data filters, of the plurality of data filters, that correspond to the corresponding user interaction;

generate filtered event data based on filtering the event data stream based at least in part on the plurality of specificity scores;

analyze, after generating the filtered event data, changes in the plurality of specificity scores;

identify a particular point, in the filtered event data associated with a reduction in a specificity score, of the plurality of specificity scores and relative to a prior specificity score of the plurality of specificity scores, that satisfies a specificity threshold;

remove, after generating the filtered event data, event data of the event data stream occurring after the particular point;

identify, after generating the filtered event data and removing the event data, one or more pivot points, associated with the filtered event data, based at least in part on the plurality of specificity scores, each pivot point being associated with a change in the specificity;

identify, based at least in part on the plurality of specificity scores and the one or more pivot points, a set of relevant filter values associated with the event data stream; and provide output indicating the set of relevant filter values.

2. The event data analysis system of claim 1, wherein the one or more processors are further configured to:

generate at least one entropy value for at least one data filter of the plurality of data filters, each entropy value indicating a rate of change of a corresponding data filter across the event data stream.

3. The event data analysis system of claim 2, wherein the one or more processors, to identify the set of relevant filter values, are configured to:

identify the set of relevant filter values based at least in part on the at least one entropy value.

4. The event data analysis system of claim 2, wherein the set of relevant filter values comprises at least one of:

at least one filter value associated with an entropy value that satisfies an entropy threshold, or at least one filter value associated with a pivot point of the one or more pivot points.

5. The event data analysis system of claim 1, wherein the one or more processors, to generate the plurality of specificity scores, are configured to:

generate, based at least in part on a set of data filters that correspond to a particular user interaction, a specificity score, of the plurality of specificity scores, that is based at least in part on a number of results being excluded by the set of data filters.

6. The event data analysis system of claim 5, wherein each data filter is associated with a weight that is based at least in part on a number of available values associated with the data filter.

7. The event data analysis system of claim 6, wherein the one or more processors, to generate the specificity score, are configured to:
    generate the specificity score as a logarithm of a product of weights associated with the set of data filters.

8. The event data analysis system of claim 1, wherein the one or more processors, to identify the particular point, are configured to:
    identify a plurality of local maximum points in the filtered event data,
        wherein the plurality of local maximum points comprises the one or more pivot points.

9. The event data analysis system of claim 1, wherein the one or more processors, to provide the output, are configured to:
    provide data indicating a visual representation of the plurality of specificity scores and plurality of pivot points over time, or
    provide data indicating a recommendation associated with the set of relevant filter values.

10. The event data analysis system of claim 1, wherein the one or more processors are further configured to:
    determine, for each filter value of the set of relevant filter values, a relevance score based on:
        the specificity score associated with the filter value,
        an entropy value that indicates a rate of change of the one or more data filters across the event data stream, and
        an association of the filter value with the pivot point,
        wherein the output is further based on the relevancy score for each filter value of the set of relevant filter values.

11. A method for analyzing event data, comprising:
    identifying, by a data processing device, an event data stream that indicates a plurality of user interactions with a plurality of data filters of an application;
    generating, after identifying the event data stream and by the data processing device, a plurality of specificity scores, each of the plurality of specificity scores indicating, for a corresponding user interaction of the plurality of user interactions, a measure of specificity associated with one or more data filters, of the plurality of data filters, that correspond to the corresponding user interaction;
    generating, by the data processing device, filtered event data based on filtering the event data stream based at least in part on the plurality of specificity scores;
    analyzing, by the data processing device and after generating the filtered event data, changes in the plurality of specificity scores;
    identifying, by the data processing, a particular point, in the filtered event data associated with a reduction in a specificity score, of the plurality of specificity scores and relative to a prior specificity score of the plurality of specificity scores, that satisfies a specificity threshold;
    removing, after generating the filtered event data, event data of the event data stream occurring after the particular point;
    generating, after generating the filtered event data and removing the event data, at least one entropy value for at least one data filter of the plurality of data filters, each entropy value indicating a rate of change of a corresponding data filter, of the plurality of data filters, across the event data stream;
    identifying, by the data processing device and based at least in part on the plurality of specificity scores and the at least one entropy value, a set of relevant filter values associated with the event data stream; and
    providing, by the data processing device, output indicating the set of relevant filter values.

12. The method of claim 11, further comprising:
    analyzing, by the data processing device and based at least in part on the plurality of specificity scores, the filtered event data to identify one or more pivot points associated with the filtered event data, each pivot point being associated with a change in specificity.

13. The method of claim 12, wherein identifying the set of relevant filter values comprises:
    identifying the set of relevant filter values based at least in part on the one or more pivot points.

14. The method of claim 12, wherein the set of relevant filter values comprises at least one of:
    at least one filter value associated with an entropy value that satisfies an entropy threshold, or at least one filter value associated with a pivot point of the one or more pivot points.

15. The method of claim 12, wherein identifying the particular point comprises:
    identifying a plurality of local maximum points in the filtered event data,
    wherein the plurality of local maximum points comprises the one or more pivot points.

16. The method of claim 12, wherein providing the output comprises:
    providing data indicating a visual representation of the plurality of specificity scores and the one or more pivot points over time, or
    providing data indicating a recommendation associated with the set of relevant filter values.

17. The method of claim 11, wherein generating the plurality of specificity scores comprises:
    generating, based at least in part on a set of data filters that correspond to a particular user interaction, a specificity score that is based at least in part on a number of results being excluded by the set of data filters.

18. The method of claim 17, wherein each data filter is associated with a weight that is based at least in part on a number of available values associated with the data filter.

19. The method of claim 11, further comprising:
    determining, for each filter value of the set of relevant filter values, a relevance score based on:
        the specificity score associated with the filter value,
        an entropy value that indicates a rate of change of the one or more data filters across the event data stream, and
        an association of the filter value with a pivot point of the one or more pivot points,
        wherein the output is further based on the relevancy score for each filter value of the set of relevant filter values.

20. A non-transitory computer-readable medium storing a set of instructions, the set of instructions comprising:
    one or more instructions that, when executed by one or more processors of a device, cause the device to:
        identify an event data stream that indicates a plurality of user interactions with a plurality of data filters of an application;
        generate, after identifying the event data stream, a plurality of specificity scores, each of the plurality of specificity scores indicating, for a corresponding user interaction of the plurality of user interactions, a measure of specificity associated with one or more data filters, of the plurality of data filters, that correspond to the corresponding user interaction;

generate filtered event data based on filtering the event data stream based at least in part on the plurality of specificity scores;

analyze, after generating the filtered event data, changes in the plurality of specificity scores;

identify a particular point, in the filtered event data associated with a reduction in a specificity score, of the plurality of specificity scores and relative to a prior specificity score of the plurality of specificity scores, that satisfies a specificity threshold;

remove, after generating the filtered event data, event data of the event data stream after the particular point;

identify, after generating the filtered event data and removing the event data, one or more pivot points, associated with the filtered event data, based at least in part on the plurality of specificity scores, each pivot point being associated with a change in the specificity;

identify, based at least in part on the plurality of specificity scores and the pivot points, a set of relevant filter values associated with the event data stream; and provide output indicating the set of relevant filter values.

\* \* \* \* \*